United States Patent [19]

Mehta

[11] Patent Number: 5,427,851
[45] Date of Patent: Jun. 27, 1995

[54] PRESSURE SENSITIVE ADHESIVE AND ADHESIVE COATED PRODUCT

[75] Inventor: Rajendra Mehta, Dayton, Ohio

[73] Assignee: The Standard Register Company, Dayton, Ohio

[21] Appl. No.: 197,639

[22] Filed: Feb. 16, 1994

[51] Int. Cl.6 .................... B32B 7/12; B32B 29/00; C08L 7/02

[52] U.S. Cl. .................... 428/356; 428/537.5; 428/355; 428/496; 525/84; 524/925; 524/928; 524/88

[58] Field of Search ............ 428/537.5, 496, 356, 428/355; 525/84; 524/925, 928, 88

[56] References Cited

U.S. PATENT DOCUMENTS

| | | | |
|---|---|---|---|
| 3,778,306 | 12/1973 | Stow | 428/356 X |
| 3,981,958 | 9/1976 | Nakashima et al. | 260/878 R |
| 4,284,541 | 8/1981 | Takeda et al. | 525/84 X |
| 4,755,550 | 7/1988 | Shuman et al. | 524/925 X |
| 4,918,128 | 4/1990 | Sakai | 524/450 |
| 4,942,201 | 7/1990 | Briggs et al. | 525/84 X |
| 5,190,818 | 3/1993 | Sakai | 428/356 X |
| 5,193,850 | 3/1993 | Lombardo | 281/2 |
| 5,288,014 | 2/1994 | Meyers et al. | 229/304 |

Primary Examiner—Daniel R. Zirker
Attorney, Agent, or Firm—Killworth, Gottman, Hagan & Schaeff

[57] ABSTRACT

A pressure sensitive adhesive composition is provided for use on cellulosic substrates which will not become tacky under high temperatures, lose adhesive properties due to contact with silicone oils, "block" when stacked prior to printing, or lose bond-forming ability with age. Non-thermoplastic pigment particles and a compound selected from the group consisting of a natural rubber latex, a graft copolymer of natural rubber and acrylic monomer and a blend of the natural rubber latex and the graft copolymer are mixed together to form an adhesive with a glass transition temperature in the range of $-10°$ to $-78°$ C., a dielectric constant of about 2.25 to 2.62 and a green strength of 0.05 to 0.75 p.s.i. The adhesive may also optionally contain a chloroprene-methacrylic acid copolymer latex and a vinyl-methacrylic acid copolymer latex.

10 Claims, 1 Drawing Sheet

PRESSURE SENSITIVE ADHESIVE AND ADHESIVE COATED PRODUCT

BACKGROUND OF THE INVENTION

This invention relates to a pressure sensitive adhesive for use on paper products which are subjected to high temperature conditions, and more particularly to an adhesive for use on documents such as mailer forms produced by laser printing.

The use of "self" adhesives for use in mailer forms is well known. In the past, heat seal adhesives were used on forms which were not subjected to heat and pressure until the final printed form was sealed by applying heat to the adhesive. However, new adhesives were required with the advent of laser printers, which generally use heat and pressure (fuser rolls) for adhering toner images to paper. These adhesives need to form strong bonds under pressure alone and be able to withstand fuser roll temperatures of up to 450° F. without becoming tacky.

Much effort has been made to adapt "self" adhesives such as natural rubber latex coatings to the needs of laser printers. These coatings generally are adherent with other coatings of the same material but are not adherent toward other surfaces. The pressure seals made after printing in laser printers using such "self" adhesives have not been entirely satisfactory for several reasons. First, such adhesives have adhered to the fuser rolls, causing fouling or jamming. Second, silicone oils which are commonly applied to fuser roll surfaces have transferred to the adhesives, preventing formation of strong self-adhesive bonds. Third, adhesive coated forms are stored in stacks, packs or rolls prior to printing and "blocking" often occurs, which causes the adjacent piles to stick together, thus preventing proper feeding. Finally, such prior adhesive coatings lose bond-forming ability with age.

Some efforts have been made to correct these problems using adhesives such as the one disclosed in U.S. Pat. No. 4,918,128. This adhesive is composed of a graft polymerized natural rubber latex with styrene and methyl methacrylate comonomers and a non-thermoplastic particulate solid.

Still, there remains a need in the art for a pressure sensitive adhesive which will not become tacky under high temperatures, lose adhesive properties due to contact with silicone oils, "block" when stacked prior to printing, or lose bond-forming ability with age.

SUMMARY OF THE INVENTION

The present invention meets that need by providing a pressure sensitive adhesive for use on laser printed documents which combines non-thermoplastic pigment particles and a compound selected from the group consisting of a natural rubber latex, a graft copolymer of natural rubber and acrylic monomer and a blend of the natural rubber latex and the graft copolymer. These compounds produce an adhesive capable of withstanding the heat and pressure conditions of the fuser rolls in sheet fed and web fed laser printers such as the Xerox 4050, the Siemens 2140, the IBM 3800 and 3900 and still form a secure bond under pressure alone.

The adhesive comprises non-thermoplastic pigment particles, a compound selected from the group consisting of unmodified natural rubber latex, a graft copolymer of natural rubber and acrylic monomer and a blend of the unmodified natural rubber latex and the graft copolymer and optionally one or more compounds selected from the group consisting of chloroprene-methacrylic acid copolymer latex and a vinyl-methacrylic acid copolymer latex. The adhesive has a glass transition temperature (Tg) in the range of $-10°$ to $-78°$ C., a dielectric constant of about 2.25 to 2.62 and a green strength of 0.05 to 0.75 p.s.i.

In a preferred embodiment, the acrylic monomer used in the graft copolymer is chosen from the group consisting of ethyl acrylate, methyl methacrylate and ethyl methacrylate. In addition, the graft copolymer contains the acrylic monomer in a weight percent of 30 to 50% and has a glass transition temperature of from about $-60°$ to $-65°$ C. When present, the optional chloroprene-methacrylic acid copolymer latex should have a glass transition temperature of about $-45°$ C. and be used in the adhesive in a weight percent of from 10 to 40%. It is also desirable for the optional vinyl-methacrylic acid copolymer latex when present to have a glass transition temperature in the range of from $-14°$ to $-25°$ C. and be used in the adhesive in a weight percent of from 10 to 40%.

The natural rubber latex and the graft copolymer of natural rubber and acrylic monomer of the present invention give the adhesive the properties necessary for effective pressure sensitive. The graft copolymer also reduces tack, which prevents blocking. The non-thermoplastic pigment also reduces surface tack to prevent blocking and absorbs the silicone oils used on fuser rolls. The optional chloroprene-methacrylic acid copolymer latex and vinyl-methacrylic acid copolymer latex help to prevent premature drying of the adhesive during the application of the adhesive to a substrate.

Accordingly, it is an object of the present invention to provide an adhesive which will not become tacky under high temperatures, lose adhesive properties due to contact with silicone oils, "block" when stacked prior to printing, or lose bond-forming ability with age.

DETAILED DESCRIPTION OF THE PREFERRED EMBODIMENTS

Figure 1:
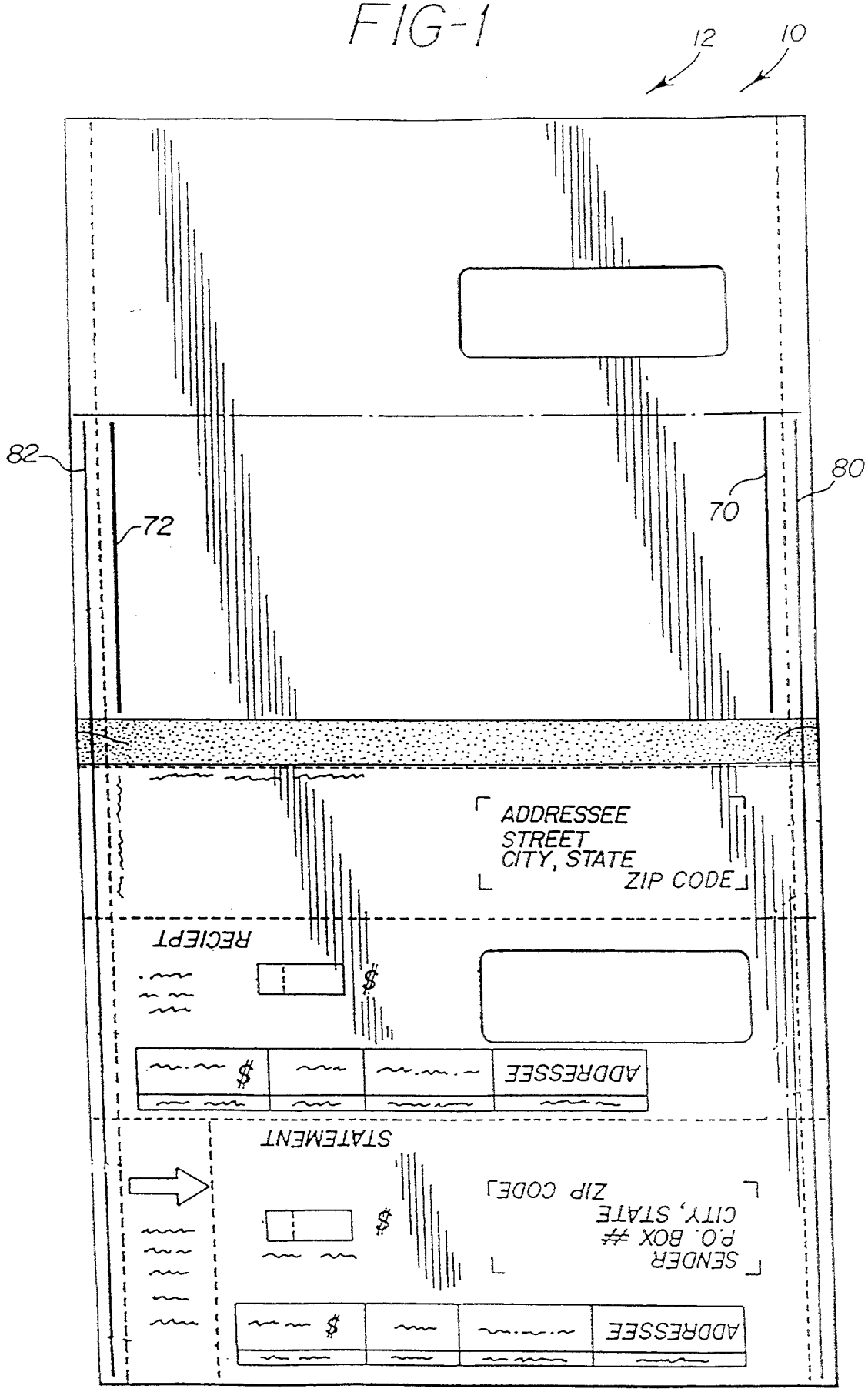
FIG. 1 illustrates a typical cellulosic substrate which has been coated with a pressure sensitive adhesive in accordance with the present invention.

FIG. 1 illustrates a typical embodiment of the adhesive coated product of the present invention. A single sheet of paper 10 is used to make a mailer document 12. The adhesive is applied to the mailer at lines 70, 72, 80 and 82. Further examples of the adhesive coated products which may make use of the adhesive of the present invention are illustrated in U. S. Pat. No. 5,288,014, the disclosure of which is hereby incorporated by reference.

The adhesive may be applied to any suitable cellulosic substrate and plastic substrates, preferably those having porous surfaces that would allow the adhesive to adhere securely such as Tyvek TM polyolefins. In a preferred embodiment, the adhesive is applied to the substrate to provide a thickness when dry of from 0.3 to 0.7 mil, and most preferably about 0.5 mil. The adhesive may be used to form various mailer products or envelopes which require adhesives.

In its preferred form, the adhesive of the present invention comprises a blend of a non-thermoplastic pigment particle such as silica which has a particle size of 1–40 microns, a natural rubber latex which is not chemically modified, and a graft copolymer of natural rubber and acrylic monomer, the monomer preferably being selected from the group consisting of alkyl acrylates and alkyl methacrylates. The monomer most being selected from the group consisting of ethyl acrylate, methyl methacrylate and ethyl methacrylate. The adhesive also optionally contains a chloroprene-methacrylic acid copolymer latex and a vinyl-methacrylic acid copolymer latex. The required physical characteristics of the final adhesive are a glass transition temperature (Tg) in the range of $-10°$ to $-78°$ C., a dielectric constant of about 2.25 to 2.62 and a green strength of 0.05 to 0.75 p.s.i.

The non-thermoplastic filler pigment may be any convenient organic or inorganic hard-particle pigment such as, for example, silica gel. It is used in a solids weight percent of 1 to 10%, most preferably about 2%. The effect the pigment has on the dried adhesive film is to reduce surface tack, which prevents blocking and improves feeding of forms having the adhesive. It also absorbs the silicone oils used on many printer fuser rolls.

The unmodified natural rubber latex is a natural product obtained from rubber trees. It can be used in a solids weight percent of 0 to 99%, and most preferably in an aqueous emulsion containing about 55% rubber solids. It is comprised mainly of cis 1,4-polyisoprene (93–95 wt %), moisture (0.3–1.0 wt %), acetone soluble residue (1.5–4.5 wt %), proteins (2.0–3.0 wt %), and ash (0.2–0.5 wt %). The nominal properties of a dried film of natural rubber are a glass transition temperature of $-72°$ C., a dielectric constant of 2.37 and a green strength of 0.72 p.s.i.

The graft polymerized natural rubber latex is produced by reacting the natural latex with an acrylic monomer. This results in random and block copolymerization of the acrylic monomer with the natural rubber of polyisoprene. This treatment provides a dried film adhesive with increasing hardness, reducing tack and blocking tendency, raises the glass transition temperature from about $-72°$ C. to about $-60°$ to $-65°$ C., and decreases the bond strength formed when two films are joined by pressure. At some ratios, the resultant copolymer may show two glass transition temperatures, one due to the natural rubber and one due to the added copolymer. The graft copolymers used in the present invention contain from 30% to 50% of the acrylic comonomer based on the weight of the copolymer. The latex is preferably used as an aqueous emulsion of about 58% solids. However, the graft copolymer can be used in a solids weight percent of from 0 to 99%.

The optional chloroprene-methacrylic acid copolymer latex preferably has a glass transition temperature of about $-45°$ C. and is present in the adhesive in a weight percent of from 10 to 40%. A satisfactory chloroprene-methacrylic acid copolymer for use in the present invention is Neoprene 115 from du Pont, which is supplied as a 45% solids content composition.

The optional vinyl-methacrylic acid copolymer latex has a glass transition temperature in the range of from $-14°$ to $-25°$ C. and is present in the adhesive in a weight percent of from 10 to 40%. An example of a vinyl-methacrylic acid copolymer latex which can be used in the present invention is Haloflex 320 TM from Zeneca Resins, a division of ICI.

The final adhesive may also contain water, and lesser amounts of ammonia, defoamer and dye. The water helps to prevent premature drying and can be present in a weight percent of 1 to 10% in addition to the water already present in the aqueous latex emulsions. The ammonia helps to stabilize the rubber latex and provide a basic pH. It can be used in a weight percent of 0.1 to 1.0%. The defoamer is used to prevent foaming of the adhesive in use and during application. It can be used in a weight percent of 0 to 0.2%. The dye is used for aesthetic reasons to make the adhesive more visible to the user and can be any color. The dye should be water-soluble and can be used in a weight percent of 0 to 0.2%.

In order that the invention may be more readily understood, reference is made to the following example which is intended to illustrate the invention, but not limit the scope thereof.

EXAMPLE 1

A pressure sensitive adhesive composition was prepared in accordance with the present invention by blending 75% (weight percentage) unmodified natural rubber latex (55% solids), 17% of a graft copolymer of natural rubber and methyl methacrylate (58% solids), 5.1% water, 2% inorganic Cabosil silica pigment particles from Cabot, 0.4% ammonia, 0.01% water soluble dye and 0.01% defoamer. The composition was applied by a Flexo Analox roll at a thickness of from 0.25 to 0.5 mil to a cellulosic substrate and then dried using a radio frequency dryer. The dried film adhesive exhibited satisfactory stability under high temperatures and did not lose adhesive properties due to contact with silicone oils, "block" when stacked prior to printing, or lose bond-forming ability with age.

What is claimed is:

1. An adhesive coated cellulosic substrate for use in producing laser printed documents comprising:
   a cellulosic substrate coated with an adhesive formed from non-thermoplastic pigment particles, a compound selected from the group consisting of a graft copolymer of natural rubber and acrylic monomer and a blend of a natural rubber latex and said graft copolymer; and one or more compounds selected from the group consisting of chloroprene-methacrylic acid copolymer latex and vinyl-methacrylic acid copolymer latex, said adhesive having a glass transition temperature in the range of from $-10°$ to $-78°$ C. and a green strength of 0.05 to 0.75 p.s.i.

2. The adhesive coated cellulosic substrate of claim 1 wherein said non-thermoplastic pigment particles have a particle size of 1–40 microns and are present in said adhesive in a solids weight percent of 1 to 10%.

3. The adhesive coated cellulosic substrate of claim 2 wherein said non-thermoplastic pigment particles are present in said adhesive in a solids weight percent of about 2%.

4. The adhesive coated cellulosic substrate of claim 1 wherein said natural rubber latex is present and is not chemically modified.

5. The adhesive coated cellulosic substrate of claim 4 wherein said graft copolymer is present and has an acrylic monomer content of 30 to 50% by weight.

6. The adhesive coated cellulosic substrate of claim 5 wherein said graft copolymer has a glass transition temperature of from about $-60°$ to $-65°$ C.

7. The adhesive coated cellulosic substrate of claim 6 wherein said acrylic monomer is selected from the group consisting of alkyl acrylates and alkyl methacrylates.

8. The adhesive coated cellulosic substrate of claim 7 wherein said acrylic monomer is selected from the group consisting of ethyl acrylate, methyl methacrylate and ethyl methacrylate.

9. The adhesive coated cellulosic substrate of claim 1 wherein said chloroprene-methacrylic acid copolymer latex is present and said copolymer latex has a glass transition temperature of about −45° C.

10. The adhesive coated cellulosic substrate of claim 1 wherein said vinyl-methacrylic acid copolymer latex is present and has a glass transition temperature in the range of from −14° to −25° C.

* * * * *